(12) United States Patent
Williams

(10) Patent No.: US 9,207,338 B2
(45) Date of Patent: Dec. 8, 2015

(54) VEHICULAR-BASED EARTHQUAKE EARLY WARNING AND DAMAGE ASSESSMENT

(71) Applicant: Aaron Williams, San Jose, CA (US)

(72) Inventor: Aaron Williams, San Jose, CA (US)

(73) Assignee: SAP AG, Walldorf (DE)

(*) Notice: Subject to any disclaimer, the term of this patent is extended or adjusted under 35 U.S.C. 154(b) by 38 days.

(21) Appl. No.: 13/917,077

(22) Filed: Jun. 13, 2013

(65) Prior Publication Data
US 2014/0368341 A1    Dec. 18, 2014

(51) Int. Cl.
*G08B 21/00* (2006.01)
*G01V 1/00* (2006.01)
*G08B 21/10* (2006.01)
*G08B 27/00* (2006.01)

(52) U.S. Cl.
CPC ............... *G01V 1/008* (2013.01); *G08B 21/10* (2013.01); *G08B 27/005* (2013.01); *G08B 27/001* (2013.01)

(58) Field of Classification Search
CPC ........ G08B 27/006; G06F 9/06; G01V 1/008; G11B 17/225; G11B 15/6835; H01H 1/0036
USPC .............. 340/540, 690, 686.1, 669, 521–527, 340/534, 539.22, 539.26, 566
See application file for complete search history.

(56) References Cited

U.S. PATENT DOCUMENTS

| 5,001,466 A * | 3/1991 | Orlinsky et al. ............... 340/690 |
| 5,563,575 A * | 10/1996 | Yamamura et al. ........... 340/429 |
| 5,918,155 A * | 6/1999 | Nakamura et al. ............ 455/12.1 |
| 8,706,654 B2 * | 4/2014 | Bertogg .......................... 706/12 |
| 2011/0032794 A1 * | 2/2011 | Rhodes et al. .................. 367/15 |
| 2012/0163562 A1 * | 6/2012 | Takuno et al. .................. 379/46 |
| 2013/0013544 A1 * | 1/2013 | Lee ................................. 706/27 |

* cited by examiner

*Primary Examiner* — Daniel Previl
(74) *Attorney, Agent, or Firm* — Mintz Levin Cohn Ferris Glovsky and Popeo, P.C.

(57) ABSTRACT

The systems, methods and articles described herein are directed to a cloud based server which can access and retrieve data for dynamically calculating and generating information relating to an earthquake (or other hazard event), including damage and injury caused by the earthquake. In addition, the information relating to the earthquake can be distributed to one or more cloud connected vehicles and external sources, such as for either providing early warning or assistance with emergency response. Related apparatus, systems, techniques and articles are also described.

21 Claims, 2 Drawing Sheets

VEHICULAR-BASED EARTHQUAKE EARLY WARNING AND DAMAGE ASSESSMENT

TECHNICAL FIELD

The subject matter described herein relates to accessing and retrieving data identifying one or more earthquake conditions (as well as other hazard events) for dynamically processing and generating instructions for one or more cloud connected vehicles. In addition, the one or more cloud connected vehicles can sense data characterizing one or more local conditions which can then be either stored or sent to the cloud based server. The data collected by the one or more cloud connected vehicles can be used by the system to at least identify locations of earthquake damage and where emergency care is needed.

BACKGROUND

It can be chaotic after some earthquakes, particularly major earthquakes which have caused damage to both structures and people. After an earthquake, people and government organizations, including the police force and emergency responders, try and locate areas with the greatest amount of damage. Most people rely on their local emergency system (e.g., dialing 911) to report damage and requests for help which can overwhelm the emergency system and delay emergency assistance.

Due to the potential damage which can be caused by an earthquake, such as structure damage and people incurring injuries, it can be beneficial to provide an early warning system. An early warning system can allow time for people and businesses to prepare for an earthquake, including enough time for people to move to a safe location and for businesses to shut down and move workers away from dangerous locations. In addition, an early warning system can provide medical professionals time to stop delicate procedures and protect travelers by allowing them time to either slow down or move away from dangerous structures, such as bridges. Early warning systems can also allow time for emergency responders to prepare to respond, including opening fire station doors and starting generators.

Although early warning systems can be advantageous, they can be expensive and difficult to implement and maintain due to the large area of land and the number of people and businesses which can be affected by earthquakes. In addition, some warning systems are limited in their ability to warn people and businesses and at least some cannot acquire and relay information about earthquake damage. Therefore, information associated with or characterizing an earthquake, including extent of seismic activity and damage, can be limited which can result in ineffective emergency response.

SUMMARY

In one aspect, a real-time computing platform receives data derived from at least one sensor from each of a plurality of vehicles characterizing at least one earthquake. Thereafter, the real-time computing platform determines at least one of a magnitude and epicenter of the at least one earthquake. Data that characterizes such determination is then provided by the real-time computing platform.

Providing data can include one or more of: displaying the data, transmitting the data, loading the data, and storing the data. The data characterizing the determination can include an alert that is transmitted to at least a portion of the plurality of vehicles during the occurrence of the at least one earthquake.

In some variations, data can be transmitted to at least a portion of the plurality of vehicles to wake up the corresponding at least one sensor in response to an earthquake event (which can be sensed by another vehicle and/or an external system). Instructions can be transmitted, in response to an earthquake event, to at least a portion of the plurality of vehicles to continuously send data derived from the at least one sensor and/or to wake up a communications device (e.g., radio, display interface, etc.). In some cases, data can be transmitted to the vehicles which causes the radio station to play radio or satellite transmission from a local emergency station. Data can also be transmitted to an external source other than the real time computing platform in response to the earthquake event.

In an interrelated aspect, a real-time computing platform, receives data derived from at least one sensor from each of a plurality of vehicles characterizing at least one hazard event. Thereafter, the real-time computing platform determines at least one location of interest or event of interest for the at least one hazard event. Data can then be provided that characterizes the determination. The at least one hazard event can include both natural and manmade disasters including: earthquakes, floods, tornadoes, sandstorms, snowstorms, ice storms, hail, fires, hurricanes. Other types of events such as chemical, gas, biological, and nuclear leaks/attacks can also be considered as hazard event.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages, including a system which can assist in improving at least the collection, processing and sending of earthquake related information, including earthquake damage and emergency response.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

The system, methods and articles described herein can improve collecting and sending data and information related to an earthquake, including earthquake warnings, areas affected by the earthquake, and earthquake damage. The system, methods and articles described herein can improve human welfare by at least improving time allowed for people and businesses to prepare for an earthquake, in addition to improved emergency response, such as to damaged structures and injured people.

Figure 1:
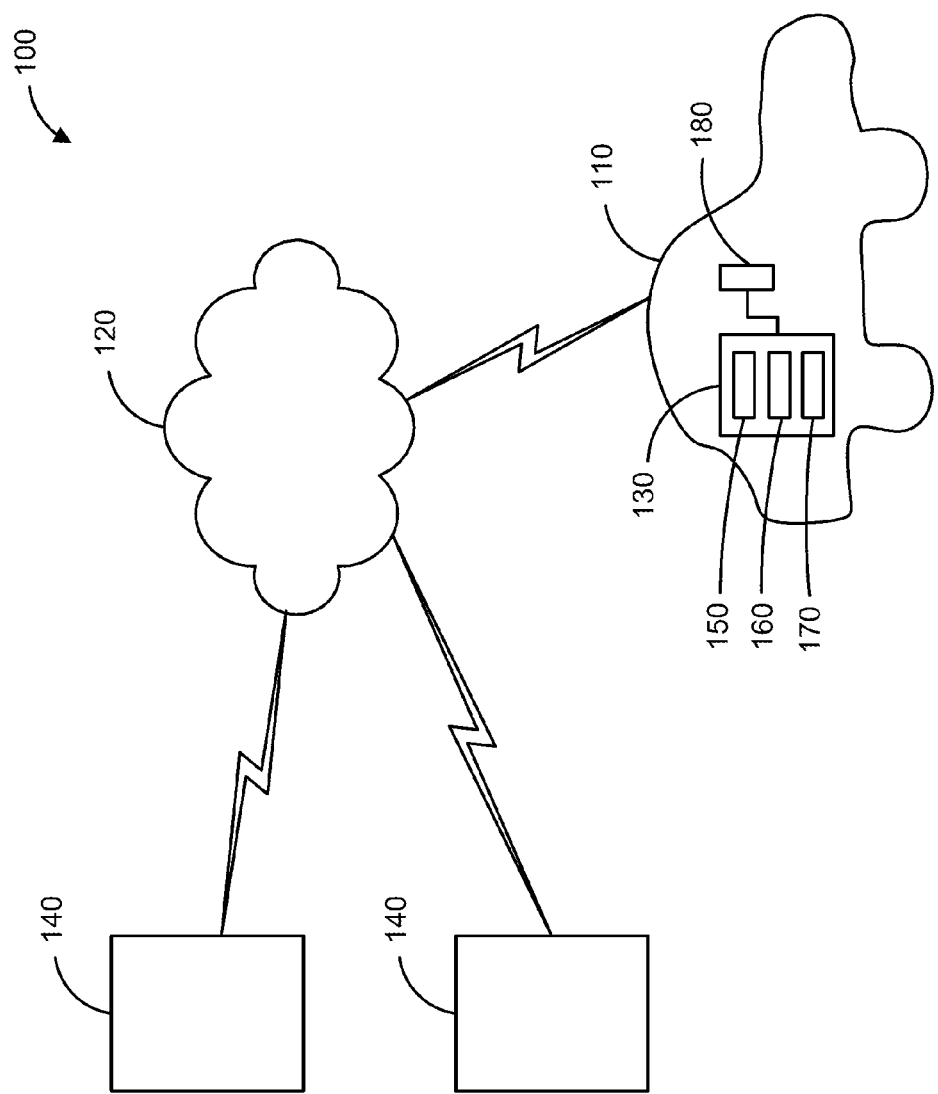
FIG. 1 shows a process flow diagram illustrating a system for collecting and sending data and information characterizing an earthquake event.

FIG. 1 shows a process flow diagram illustrating a variation of the system 100 and methods for providing an improved earthquake early warning system, as well as an improved earthquake damage assessment and emergency response system. The system 100 can include at least one cloud connected vehicle 110 which is in communication with a network, including a cloud based server 120. The network and cloud based server 120 can communicate wirelessly with the cloud connected vehicles 110. In addition, the cloud based server 120 can be in communication, including wirelessly, with one or more external sources 140 which can relay a variety of data and information to and from the cloud based server 120.

For example, the external sources 140 can include one or more earthquake monitoring systems (e.g., the United States Geological Survey (USGS), etc.), emergency services (e.g., national, regional and local emergency services, etc.), and data processing centers (e.g., a real-time database system such as the SAP HANA platform). The system 100 can allow the one or more external sources 140 to send data to the cloud based server 120 which can allow the cloud based server 120 to at least one of process and send either data or information to at least one cloud connected vehicle 110 and external source 140.

The cloud based server 120 can include a memory and processor for storing and processing data and information. In addition, the cloud connected vehicles 110 can include a processing unit 130 which can communicate with the cloud based server 120, including sending and receiving data and information.

The processing unit 130 can include at least one processor 150 and memory 160 and can communicate with one or more sensors 170 associated with the cloud connected vehicle 110. For example, the sensors 170 can include accelerometers, temperature gauges, pressure gauges, vibration sensors, gyroscopes, global positioning system (GPS), or any number of sensors which can be included in a vehicle. Data acquired by the sensors 170, (e.g., temperature, pressure, acceleration, vibration, location, etc.) can be collected by the processing unit 130 and either processed and stored into the memory 150 on-board the cloud connected vehicle 110 or the processing unit 130 can send the sensed data to the cloud based server 120.

For example, in some instances it can be beneficial for the data collected by the sensors 170 to be stored onto memory 160 on-board the cloud connected vehicle 110. This can be particularly beneficial when communication between the cloud connected vehicle 110 and cloud based server 120 has been interrupted or communication systems are overloaded, which can oftentimes be the case after damaging earthquakes.

When the data is stored into memory 160 on-board the cloud connected vehicle 110, the data can be sent to the cloud based server 120 at a later time, such as upon re-connection of communication between the cloud connected vehicle 110 and cloud based server 120.

The data acquired by the sensors 170 can provide a variety of information about an earthquake event. For example, an accelerometer on the cloud connected vehicle 110 can track a change in speed of the cloud connected vehicle 110, such as during and after the earthquake. This information can be collected and dynamically processed, including in at least near real-time, in order to detect significant changes in acceleration of cloud connected vehicles 110 in communication with the cloud based server 120. This information can assist in assessing a variety of conditions surrounding the cloud connected vehicle 110.

For example, if accelerometer data provided by at least one cloud connected vehicle 110 in a given area show rapid deceleration or that the cloud connected vehicles have come to a complete stop, this can indicate structure damage, such as a collapsed bridge due to the earthquake event. The cloud based server 120 can use this information to alert emergency response systems to the given area for assessing the earthquake damage and assisting with any injuries.

In at least some variations, when the cloud connected server 120 becomes informed that an earthquake will be affecting a particular area, the cloud connected server 120 can query any cloud connected vehicles 110 located at least within the particular area which are connected to the cloud based server 120 to continually send at least their status and location information. This can allow the cloud connected server 120 to monitor one or more areas which can be affected by an earthquake event. In addition, the cloud connected vehicles 110 can function as mobile seismic sensing units and earthquake damage assessment units by continually sending data to the cloud based server 120, including data collected by the sensors 170. Additionally, the sensor data collected by the sensors 170 can provide specific information about the earthquake, such as magnitude and epicenter of the earthquake.

Furthermore, temperature gauge information by at least one cloud connected vehicle 110 can be collected by the cloud based server 120. This information can be dynamically processed, including in at least near real-time, in order to detect either high or significant changes in temperature near or within any cloud connected vehicles in communication with the cloud based server 120. For example, after an earthquake event, one or more cloud connected vehicles 110 in a given location can send significantly increasing temperature readings to the cloud based server 120. This can be dynamically processed by the cloud based server 120 which can then generate information, such as information identifying a fire in the given location, which can be sent out to emergency services, including a fire station.

Any number of sensors included with any cloud connected vehicle 110 can provide information to the cloud based server 120 for generating a variety of information which can be used to monitor an earthquake, as well as assess and address emergency situations at least during and after an earthquake. In addition, the information provided by the external sources 140 and cloud connected vehicles, including stored information from memory 160 on-board the cloud connected vehicles 110, can be used by the cloud based server 120 to dynamically process and generate warnings to people and business, including people and businesses which will likely be affected by, or have been effected by, the earthquake.

In at least some variations, the present system 100 can be used as an early warning system. For example, the cloud based server 120 can receive data and information from seismic activity monitors, such as the USGS, indicating that an earthquake is either about to occur or is occurring. The cloud based server 120 can collect and process this information, such as in at least near real-time, and generate information which can be distributed to at least some people and business which will potentially be affected by the earthquake. This area can be defined as an earthquake danger zone. Due to the dynamic processing, generating and distribution of information in at least near real-time by the cloud based server 120, including the HANA processing system, the earthquake warning information can reach people and business before the earthquake affects them which can allow for time to prepare and prevent injuries.

Furthermore, the cloud based server 120 can generate earthquake warnings which can be sent out to all cloud connected vehicles 110 which are in communication with the cloud based server 120, including those located within the earthquake danger zone. The earthquake warnings can also be sent out to one or more external sources 140, such as emergency response, hospitals, and businesses. These warnings can be used to prepare at least those who have access to the warnings to prepare for the earthquake.

For example, an early warning can allow people to take cover under strongly supported structures, prevent cars from driving onto bridges, allow hospitals to prepare, such as stop delicate surgery, as well as allow businesses time to direct employees to safe areas. Additionally, other precautions such as opening garage doors to allow fire trucks to leave can be made by providing emergency response systems with earthquake early warning information.

Data and information collected by the cloud based system, including data and information processed by the HANA processing system, can be used to provide people and businesses with important post-earthquake information. For example, data and information collected by the cloud connected vehicles 110 can be used to locate areas damaged by the earthquake, such as fires and structure damage. This information can then be used by the system 100 to generate information, including warnings, regarding hazardous areas and emergency assistance information which can improve emergency response time for areas in need.

In some variations, the cloud connected vehicle 110 can include a subscriber identity module (SIM) card which can allow the cloud connected vehicle 110 to connect to the internet, including the network and cloud based server 120. The cloud based server 120 can continually or at given times either send or collect a variety of data from the one or more cloud connected vehicles in communication with the cloud based server 120. For example, the select times can include immediately before, during and immediately after an earthquake. In addition, the requesting and sending of information can be done automatically, such as due to an earthquake event. Similarly, the cloud based server 120 can either continually or selectively collect and send information to the one or more external sources 140. Additionally, in some variations, the cloud based server 120 can transmit data in response to an earthquake event to at least one cloud connected vehicle 110 which include instructions to at least wake up one or more on-board sensors 170 for collecting sensor data. The data collected by the sensors 170 can then be sent to the cloud based server 120 for processing and analysis.

The earthquake related information can be provided by the cloud based server 120 in a variety of ways to any number of cloud connected vehicles 110 or entities having communication with the cloud based system 120, such as businesses and emergency response. For example, the earthquake related information can be provided to a driver of a cloud connected vehicle 110 by way of a communicating device 180 of the cloud connected vehicle 110, such as a display or audio system. Any type of communicating devices 180 can be provided in a cloud connected vehicle 110 for relaying information from the cloud based server 120 to at least the driver.

In some variations, the cloud based server 120 can wake up cloud connected vehicles 110 which are connected to the cloud based server 120. For example, the cloud based server 120 can send a message to the cloud connected vehicle 110 through various channels of communication (e.g., SMS, OnStar, or various other car communication systems) which can activate direct communication between the cloud based server and the cloud connected vehicle 110. Once the cloud based server 120 has direct communication with the cloud connected vehicle 110, the cloud based server 120 can send one or more messages or information to the cloud connected vehicle 110 which can be communicated through the communication device 180.

In some variations, the communicating device 180 can be an audio system which can announce warning messages generated and sent by the cloud based server 120. As discussed above, the warning messages can include early warning messages regarding an upcoming earthquake. In addition, the warning messages can provide information relating to damage caused by an earthquake or emergency services. In some variations, the cloud based server 120 can send instructions to the connected cloud vehicles to turn on their communicating device 180 in order to allow messages to be broadcasted. For example, the cloud based server 120 can send instructions to cloud connected vehicles 110 to turn on their radio and change the station, such as to a station providing earthquake related information.

At least one benefit of the present disclosure includes the ability of the cloud connected vehicles 110 to provide either earthquake damage or earthquake activity information to the cloud based server 120. For example, one or more sensors 170 of the cloud connected vehicles 110 can provide data which can assist in assessing earthquake activity and earthquake damage, such as fires and structure damage, as discussed above. Any of this information can be either stored into memory 160 on-board the cloud connected vehicle 110, such as for sending at a later time, or sent to the cloud based server 120. In at least some variations, the cloud based server 120 can process this information, such as with the HANA processing system, to generate information related to the earthquake. For example, the HANA processing system can process the information to generate information identifying the extent of seismic activity and damage due to the earthquake.

In addition, the data and information collected by the cloud based server 120 can be used in a variety of ways, including for the research and study of earthquakes. Furthermore, the cloud connected vehicles 110 can essentially act as mobile seismic activity sensors and earthquake damage assessment units. This can both provide further education about the activity of earthquakes and improve earthquake damage assessment and emergency response. In addition, the system 100 can be used to provide either early warnings or damage assessment and emergency response for other types of large scale disasters, including natural disasters (e.g., tornadoes, hurricanes, etc.).

One example method of the system 100 includes a cloud connected vehicle 110 in wireless communication with the cloud based server 120. A seismic monitoring station, such as the USGS, can pick up seismic activity which can be communicated to the cloud based server 120. The cloud based server 120 can dynamically process the seismic activity data, including in at least near real-time, and can generate instructions based on the data. For example, the cloud based server 120 can dynamically process the data in order to determine whether the seismic activity is large enough to warrant the distribution of an earthquake warning. In addition, the cloud based server 120 can dynamically process the data and at least approximate an area that will likely be affected by the earthquake, such as an earthquake danger zone.

In some variations, once the cloud based server 120 has either determined that the seismic activity warrants an earthquake warning and has identified an earthquake danger zone, the cloud based server 120 can send out instructions, such as earthquake related warnings, to cloud connected vehicles 110 or other external sources which are in communication with the cloud based server 120. The cloud connected vehicles 110 which are connected to the cloud based server 120 can relay the earthquake related warnings via their communicating devices 180, such as an audio system or display. Therefore, at least a driver or passerby of the cloud connected vehicle 110 can have access and be informed of the information being distributed by the cloud based server 120. In addition, external sources, such as hospitals, businesses, and emergency response, which are connected to the cloud based server 120 can receive the earthquake related information provided by the cloud based server.

In addition, the cloud based server 120 can limit the distribution of the earthquake related information to only external sources and cloud connected vehicle 110 which are either within or near the earthquake danger zone. Additionally, the cloud based server can send out requests for information, such as data sensed from cloud connected vehicle sensors 170 located within or near the earthquake danger zone. This can allow the cloud based server 120 to analyze and assess, including process the information with the HANA processing system in at least near real-time, at least one of seismic activity and earthquake damage. This can allow the cloud based server 120 to generate information related to the earthquake, such as warnings and directions to areas in need of emergency response in a quick and efficient way.

Figure 2:
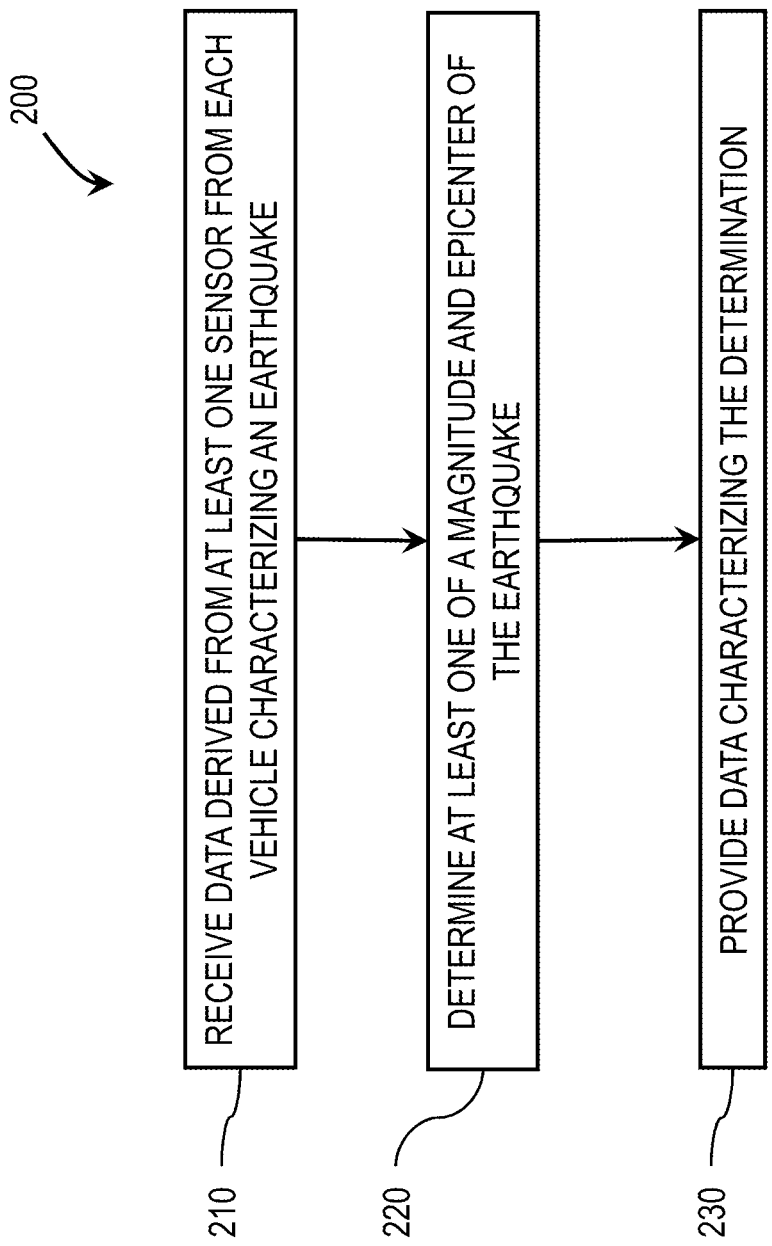
FIG. 2 illustrates a process flow diagram illustrating a method of collecting and sending data and information related to an earthquake and dynamically generating data for at least one cloud connected vehicle.

FIG. 2 illustrates a process flow diagram illustrating a method of a real-time computing platform including collecting data from and sending data to a plurality of cloud connected vehicles, and wherein the data can characterize at least one earthquake. The method can include, at 210, receiving data derived from at least one sensor from each of a plurality of vehicles characterizing at least one earthquake. Thereafter, at 220, the method can include determining at least one of a magnitude and epicenter of the at least one earthquake. In addition, at 230, the method can include providing data characterizing the determination. Additionally, providing the data can include at least one of displaying the data, transmitting the data, loading the data, and storing the data.

It will be appreciated that while the above is primarily directed to earthquakes, the teachings described herein can be applied to other hazard events including, for example, tornadoes, hurricanes, fires, floods, sandstorms, sandstorms, ice storms, snowstorms, and the like. References herein to earthquake or earthquake event can be interchanged with hazard event and epicenter with a point of interest regarding such hazard event and magnitude can refer to an event of interest.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
    receiving, by a real-time computing platform, data derived from at least one sensor from each of a plurality of vehicles characterizing at least one earthquake and a damaged location as a result of the at least one earthquake;
    determining, by the real-time computing platform and based on the received data, at least one of a magnitude and epicenter of the at least one earthquake and a location of the damaged location; and
    providing, by the real-time computing platform, a first set of data characterizing the at least one of the magnitude and epicenter of the at least one earthquake and a second set of data characterizing the location of the damaged location.

2. A method as in claim 1, wherein the providing the first set of data and the second set of data comprises at least one of: displaying the first set of data and the second set of data, transmitting the first set of data and the second set of data, loading the first set of data and the second set of data, and storing the first set of data and the second set of data.

3. A method as in claim 1, wherein the first set of data characterizing the at least one of the magnitude and epicenter of the at least one earthquake and the second set of data characterizing the location of the damaged location comprises an alert that is transmitted to one or more vehicles of the plurality of vehicles that are located within a danger zone, the danger zone defined by the real-time computing platform and based on the received data.

4. A method as in claim 1, further comprising:
    transmitting data, in response to an earthquake event, to at least a portion of the plurality of vehicles to wake up the corresponding at least one sensor.

5. A method as in claim 1, further comprising:
    transmitting instructions, in response to an earthquake event, to at least a portion of the plurality of vehicles to continuously send data derived from the at least one sensor.

6. A method as in claim 5, wherein the data derived from the at least one sensor comprises at least one of a status, position, temperature and accelerometer information.

7. A method as in claim 1, further comprising:
    transmitting data, in response to an earthquake event, to at least a portion of the plurality of vehicles to wake up a communications device.

8. A method as in claim 7, wherein the communications device includes at least one of a radio or a display.

9. A method as in claim 8, wherein the data includes instructions for the radio to broadcast a local emergency station.

10. A method as in claim 1, further comprising:
    transmitting data, in response to an earthquake event, to at least one external source.

11. A method as in claim 1, further comprising:
    determining, by the real-time computing platform and based on the received data, a type of damage of the damaged location, wherein the type of damage comprises one or more of a fire, a structure damage, and a road damage.

12. A non-transitory computer program product storing instructions, which, when executed by at least one data processor of at least one computing system, causes the at least one data processor to perform operations comprising:
    receiving data derived from at least one sensor from each of the plurality of vehicles characterizing at least one earthquake and a damaged location as a result of the at least one earthquake;
    determining, based on the received data, at least one of a magnitude and epicenter of the at least one earthquake and a location of the damaged location; and
    providing a first set of data characterizing the at least one of the magnitude and epicenter of the at least one earthquake and a second set of data characterizing the location of the damaged location.

13. A computer program product as in claim 12, wherein the providing the first set of data and the second set of data comprises at least one of: displaying the first set of data and the second set of data, transmitting the first set of data and the second set of data, loading the first set of data and the second set of data, and storing the first set of data and the second set of data.

14. A computer program product as in claim 12, wherein the first set of data characterizing the at least one of the magnitude and epicenter of the at least one earthquake and the second set of data characterizing the location of the damaged location comprise an alert that is transmitted to one or more vehicles of the plurality of vehicles that are located within a danger zone, the danger zone defined by the real-time computing platform and based on the received data.

15. A computer program product as in claim 12, wherein the operations further comprise:
    transmitting data, in response to an earthquake event, to at least a portion of the plurality of vehicles to wake up the corresponding at least one sensor.

16. A computer program product as in claim 12, wherein the operations further comprise:
    transmitting instructions, in response to an earthquake event, to at least a portion of the plurality of vehicles to continuously send data derived from the at least one sensor.

17. A computer program product as in claim 16, wherein the data derived from the at least one sensor comprises at least one of a status, position, temperature and accelerometer information.

18. A computer program product as in claim 12, wherein the operations further comprise:
    transmitting data, in response to an earthquake event, to at least a portion of the plurality of vehicles to wake up a communications device.

19. A computer program product as in claim 18, wherein:
    the communications device includes at least one of a radio or a display;

the data includes instructions for the radio to broadcast a local emergency station; and the operations further comprise:
    transmitting data, in response to an earthquake event, to at least one external source.

20. A method comprising:

receiving, by a real-time computing platform, data derived from at least one sensor from each of a plurality of vehicles characterizing at least one hazard event and a damaged location as a result of the at least one hazard event;

determining, by the real-time computing platform and based on the received data, at least one of a location of interest for the at least one hazard event and a location of the damaged location; and providing, by the real-time computing platform, a first set of data characterizing the at least one location of interest for the at least one hazard event and a second set of data characterizing the location of the damaged location.

21. A method as in claim 20, wherein the at least one hazard event is selected from a group consisting of: earthquakes, floods, tornadoes, sandstorms, snowstorms, ice storms, hail, fires, hurricanes, nuclear events, chemical events, biological events, and gas events.

* * * * *